United States Patent
Jeljeli et al.

(10) Patent No.: US 12,166,873 B2
(45) Date of Patent: Dec. 10, 2024

(54) UPDATEABLE ENCRYPTION IN SELF ENCRYPTING DRIVES

(71) Applicant: Seagate Technology LLC, Fremont, CA (US)

(72) Inventors: Hamza Jeljeli, Singapore (SG); Kian Beng Lim, Singapore (SG); Saravanan Nagarajan, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 347 days.

(21) Appl. No.: 17/189,927

(22) Filed: Mar. 2, 2021

(65) Prior Publication Data

US 2022/0286282 A1  Sep. 8, 2022

(51) Int. Cl.
*H04L 9/08* (2006.01)

(52) U.S. Cl.
CPC .......... *H04L 9/0891* (2013.01); *H04L 9/0863* (2013.01); *H04L 9/0894* (2013.01)

(58) Field of Classification Search
CPC .... H04L 9/0891; H04L 9/0863; H04L 9/0894
USPC ........................................................ 380/277
See application file for complete search history.

(56) References Cited

U.S. PATENT DOCUMENTS

| 8,488,795 | B2 | 7/2013 | Bücker et al. |
| 8,494,170 | B2 | 7/2013 | Kahler et al. |
| 8,582,777 | B2 * | 11/2013 | Urivskiy ............... H04L 9/0822 380/278 |
| 9,306,745 | B2 | 4/2016 | Arnold et al. |
| 10,523,434 | B1 | 12/2019 | Sharifi Mehr |
| 2007/0189541 | A1 | 8/2007 | Lam et al. |
| 2015/0016606 | A1 * | 1/2015 | Omino ................... H04L 9/0869 380/46 |
| 2016/0285638 | A1 | 9/2016 | Pearson et al. |
| 2019/0173674 | A1 * | 6/2019 | Agarwal ............... H04L 9/0891 |
| 2019/0266103 | A1 | 8/2019 | Pearson et al. |
| 2019/0288834 | A1 * | 9/2019 | Black .................... H04L 9/0861 |
| 2021/0223968 | A1 * | 7/2021 | Umesawa ............. H04L 9/3263 |

OTHER PUBLICATIONS

Improving Speed and Security in Updatable Encryption Schemes, by Dan Boneh, Saba Eskandarian, Sam Kim, and Maurice Shih, first online apparently Dec. 5, 2020 (IACR Cryptol. ePrint Arch. 2020), 65 pages.
Seagate Secure® TCG SSC Self-Encrypting Drives; Security Target; Version1.0; Apr. 4, 2018, 40 pages.

* cited by examiner

*Primary Examiner* — Kambiz Zand
*Assistant Examiner* — Phuc Pham
(74) *Attorney, Agent, or Firm* — Westman, Champlin & Koehler, P.A.

(57) ABSTRACT

A method of rotating a set of keys, having a media encryption key (MEK) and a current media encryption key encryption key (MEKEK) encrypted and stored in a self-encrypting drive (SED) having data encrypted with the MEK (MEK (data)), includes decrypting the stored MEK and the current MEKEK. A new MEK (MEK') and a new MEKEK (MEKEK') are generated. The MEKEK' is encrypted to replace the current encrypted MEKEK. A concatenation of the MEK and the MEK' is encrypted with MEKEK'. The encrypted data MEK(data) is re-encrypted with MEK'.

14 Claims, 10 Drawing Sheets

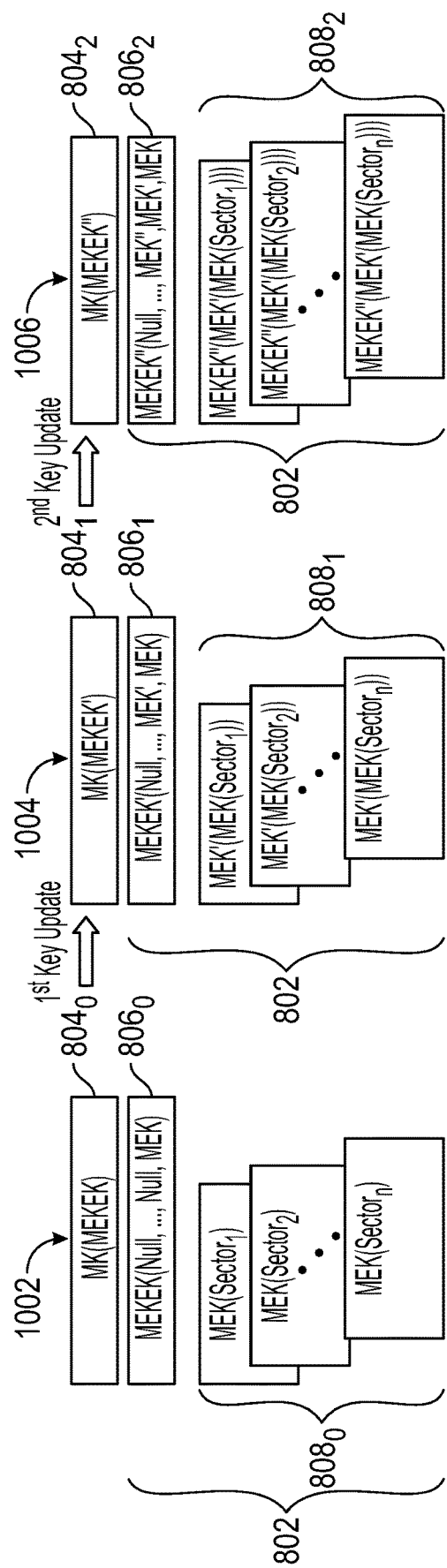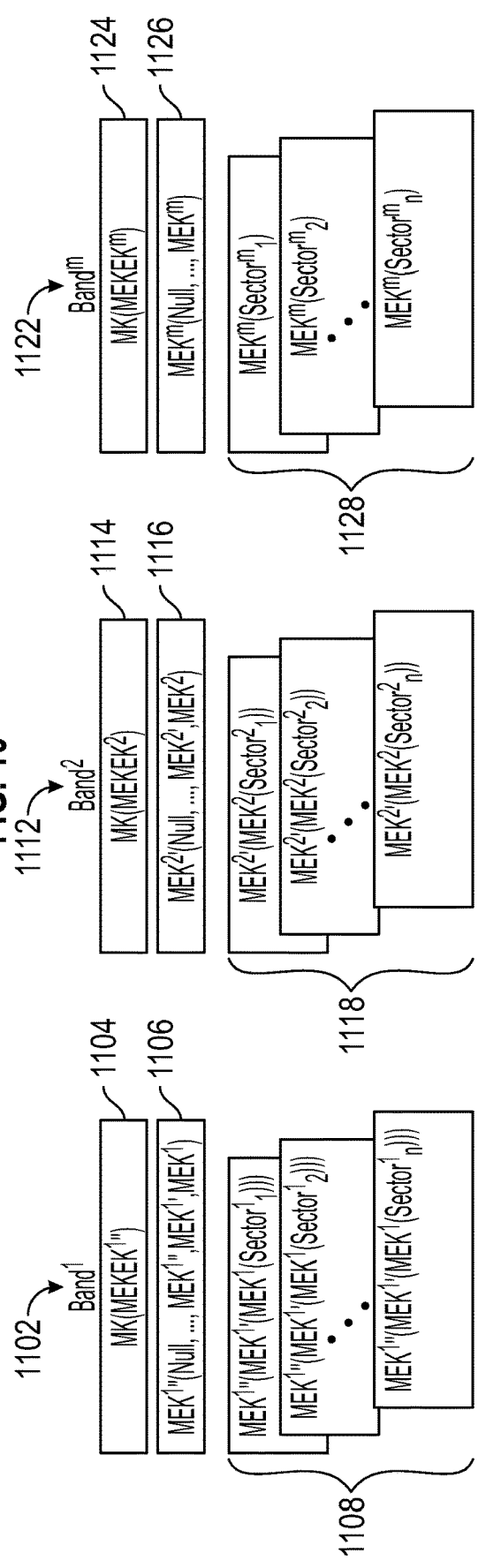
FIG. 10
FIG. 11

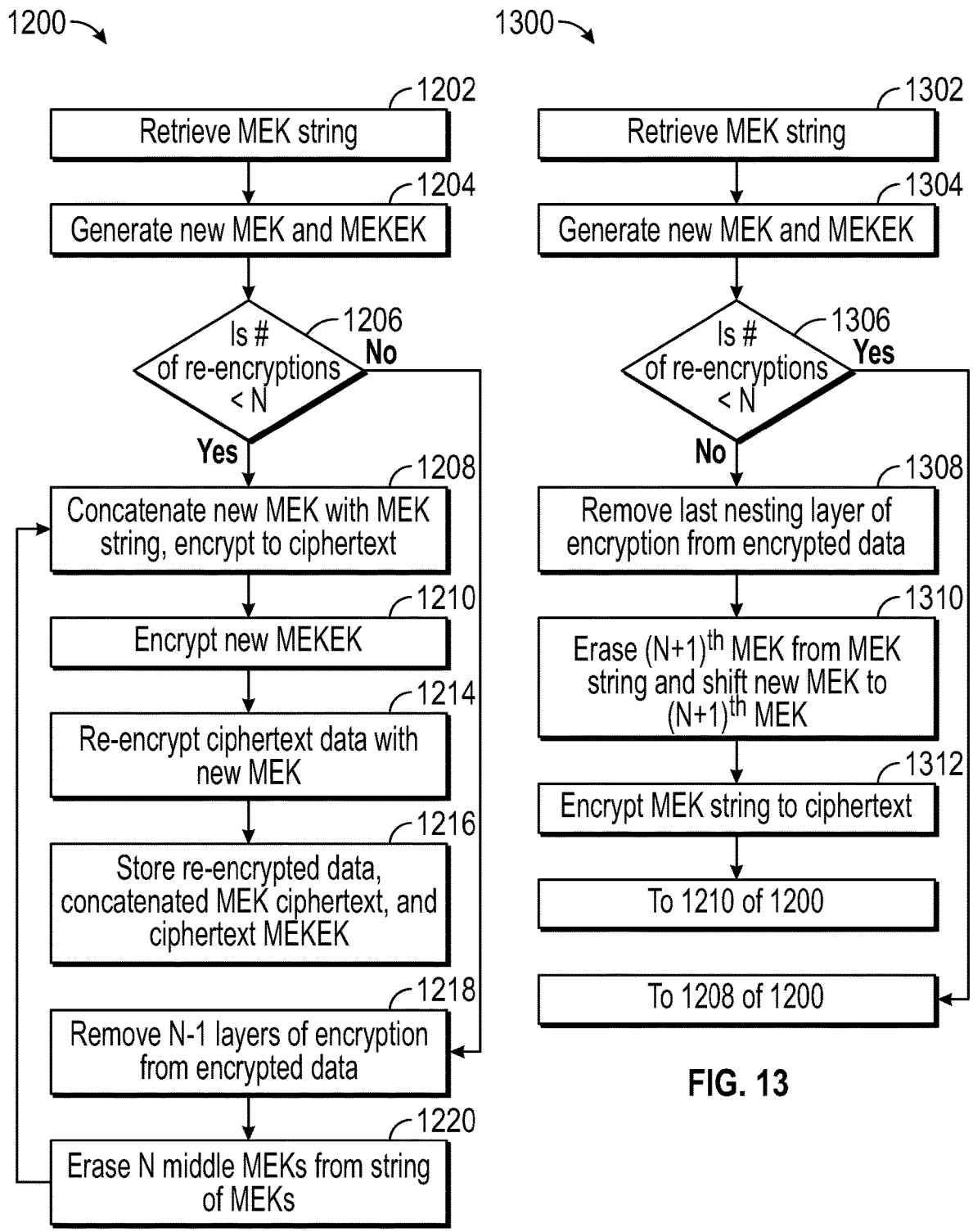

UPDATEABLE ENCRYPTION IN SELF ENCRYPTING DRIVES

SUMMARY

In one embodiment, a method of rotating a set of keys, having a media encryption key (MEK) and a current media encryption key encryption key (MEKEK) encrypted and stored in a self-encrypting drive (SED) having data encrypted with the MEK (MEK(data)), includes decrypting the stored MEK and the current MEKEK. A new MEK (MEK') and a new MEKEK (MEKEK') are generated. The MEKEK' is encrypted to replace the current encrypted MEKEK. A concatenation of the MEK and the MEK' is encrypted with MEKEK'. The encrypted data MEK(data) is re-encrypted with MEK'.

In another embodiment, a method of updating a key in a self-encrypting drive (SED) storing encrypted data MEK (data) includes deriving a master key (MK) from a user password (PIN), and decrypting wrapping keys comprising a media encryption key (MEK) and a media encryption key encryption key (MEKEK) from stored ciphertext MEKEK (MEK) and MK(MEKEK) using the MK. New wrapping keys MEK' and MEKEK' are generated. MEK(data) is re-encrypted with MEK' to obtain ciphertext MEK'(MEK (data)). MEKEK' is encrypted with MK to obtain new ciphertext MK(MEKEK'). A concatenation of MEK and MEK' is encrypted with MEKEK' in a MEK string to obtain new ciphertext MEKEK'(MEK', MEK). Ciphertext MEK' (MEK(data)), ciphertext MK(MEKEK'), and ciphertext MEKEK'(MEK', MEK) are stored in the SED.

In yet another embodiment, a method of refreshing a nested concatenation of a plurality of media encryption key (MEK) iterations and a current media encryption key encryption key (MEKEK) stored in encrypted form, the media encryption key iterations used for nested encryption and re-encryption of user data in a self-encrypting drive (SED), includes decrypting the plurality of media encryption key iterations to a MEK string, and generating a new media encryption key and a new media encryption key encryption key. A number of re-encryptions of the user data is determined using a number of non-null MEK entries in the decrypted MEK string. The stored MEK string is refreshed when a predetermined number N of re-encryptions of the encrypted data has previously occurred, as indicated by a number of non-null MEK iterations in the MEK string.

Other features and benefits that characterize embodiments of the disclosure will be apparent upon reading the following detailed description and review of the associated drawings.

BRIEF DESCRIPTION OF THE DRAWINGS

FIG. 10 is a block diagram of a key update sequence according to an embodiment of the present disclosure;

FIG. 11 is block diagram of a drive with differing re-encryption statuses for different bands of a SED according to an embodiment of the present disclosure;

FIG. 12 is a flow chart diagram of a method according to an embodiment of the present disclosure;

FIG. 13 is a block diagram of a method according to another embodiment of the present disclosure;

DETAILED DESCRIPTION OF ILLUSTRATIVE EMBODIMENTS

Figure 1:
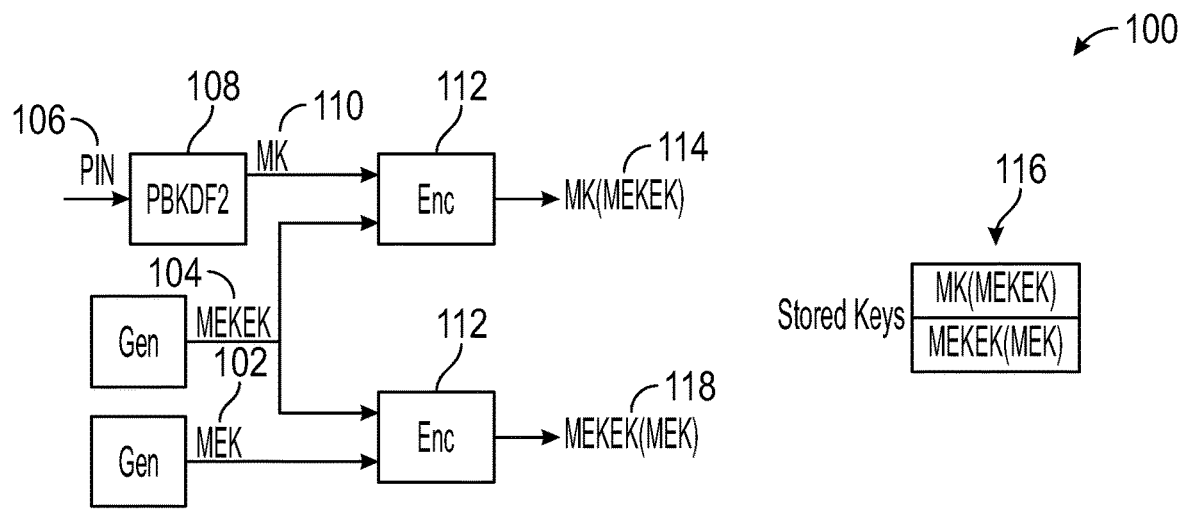
FIG. 1 is a block diagram of encrypted key storage in a self-encrypting drive (SED)

Embodiments of the disclosure generally employ an updatable encryption scheme in which a nested construction is utilized for updating/rotating keys. In general, updatable encryption allows a user of stored encrypted data on a data storage medium to re-encrypt that data under a fresh key, and to overwrite ciphertext obtained for the old key with new ciphertext obtained from the re-encryption. Embodiments of the disclosure provide updatable encryption schemes designed to support efficient and secure key rotation adapted to dataflow of self-encrypting drives (SEDs).

Embodiments of the disclosure relate to key wrapping in SEDs. A key chain is used to protect user data, including a user password or personal identification number (PIN) used as a drive lock PIN. This PIN need not only be numeric.

A SED is a hard disk drive (HDD) or solid state drive (SSD) with an encryption component (e.g., an encryption/decryption engine) built into the drive. The encryption component encrypts data written to the media of the drive. When unlocked, such as with a password or personal identification number (PIN), the SED decrypts data read from the media. Encryption keys are generated by the SED, and are used to encrypt and decrypt data once the drive is unlocked with the PIN. The encryption engine transforms unencrypted text (also referred to as plain text or clear text) into encrypted text (also referred to as ciphertext) using an encryption key. The encryption key is drive generated and is in one embodiment a symmetric key. The encryption key is known only internally by the drive.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

Prior to providing a detailed description of the different embodiments, one example of basic operations of a SEDs are described below in connection with FIGS. 1-5. At least some of these operations are used in embodiments of the present disclosure. Full details of SEDs are not provided herein.

FIG. 1 shows a block diagram 100 of generation and storage of a media encryption key (MEK) 102 and a media encryption key encryption key (MEKEK) 104 that are generated by the SED. A user PIN 106 is provided for the encryption of the MEK 102 and MEKEK 104. The PIN 106 is used as an input to a password based key derivation function (PBKDF, e.g., PBDKF2) 108 to derive a master key (MK) 110. The MK 110 is used to encrypt the drive-generated MEKEK 104 with encryption engine 112 to obtain ciphertext MK(MEKEK) 114. The result is stored in key storage 116. The MEKEK 104 is also used to encrypt the MEK 102 with encryption engine 112 to obtain ciphertext MEKEK(MEK) 118. That result is also stored in key storage 116.

Figure 2:
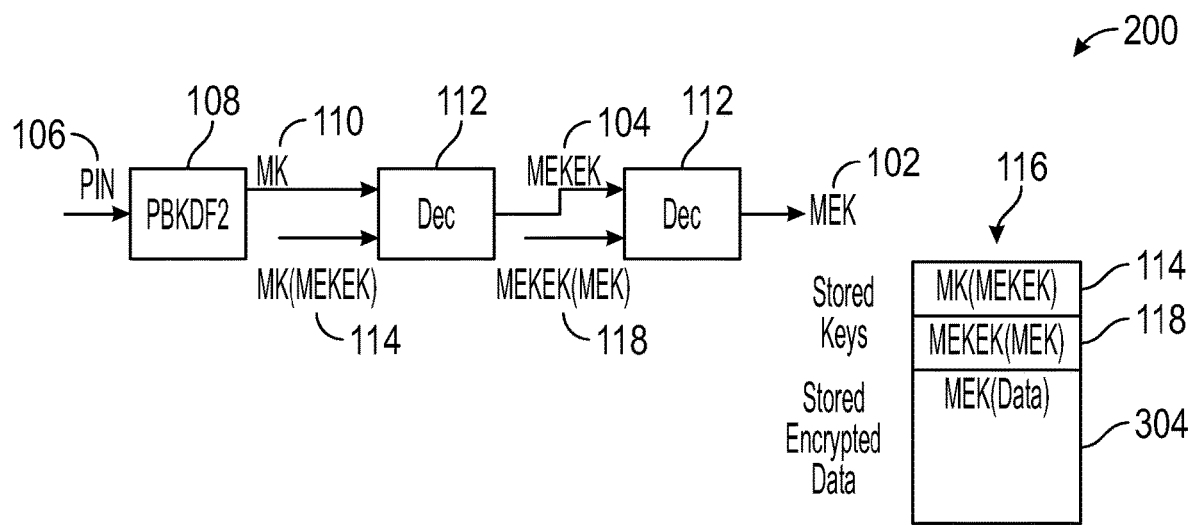
FIG. 2 is a block diagram of key retrieval in a SED.
Figure 3:
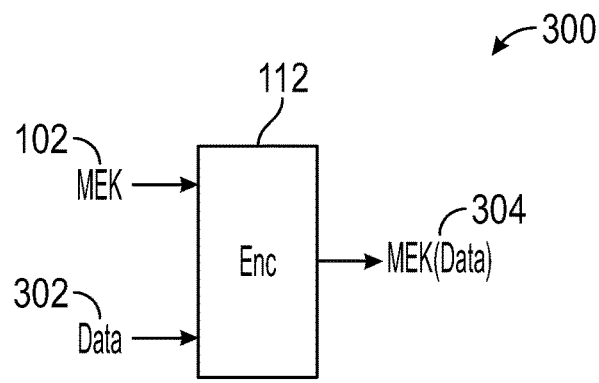
FIG. 3 is a block diagram of data encryption in a SED.

Writing of data to the SED is shown in FIGS. 2-3. To write data to the SED, the MEK is first decrypted as shown in block diagram 200 of FIG. 2. In FIG. 2, the user PIN 106 is provided to the PBKDF 108, which produces the MK 110. The MK is used to decrypt the ciphertext MK(MEKEK) 114 in the decryption engine 112 to obtain MEKEK 104 in clear text in the SED. MEKEK 104 is used to decrypt the ciphertext MEKEK(MEK) 118 in the decryption engine 112 to obtain the MEK 102 in clear text in the SED.

Encrypting data 302 to be written to the SED is shown in block diagram 300 of FIG. 3. Data 300 is encrypted with retrieved MEK 102 by encryption engine 112 to obtain ciphertext encrypted data MEK(data) 304 (e.g., ciphertext). The encrypted data 304 is stored in the SED storage 116.

Figure 4:
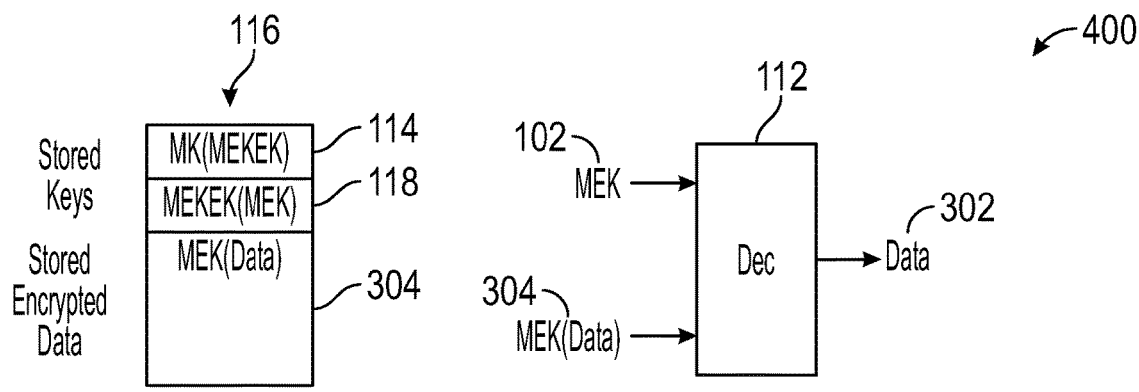
FIG. 4 is a block diagram of decryption in a SED.

Decrypting data stored in the SED is shown in block diagram 400 of FIG. 4. The MEK 102 is retrieved as described above in connection with FIG. 2. Once the MEK 102 is retrieved, it is used to decrypt the ciphertext MEK(data) 304 with decryption engine 112 to obtain data 300 in the clear.

Figure 5:
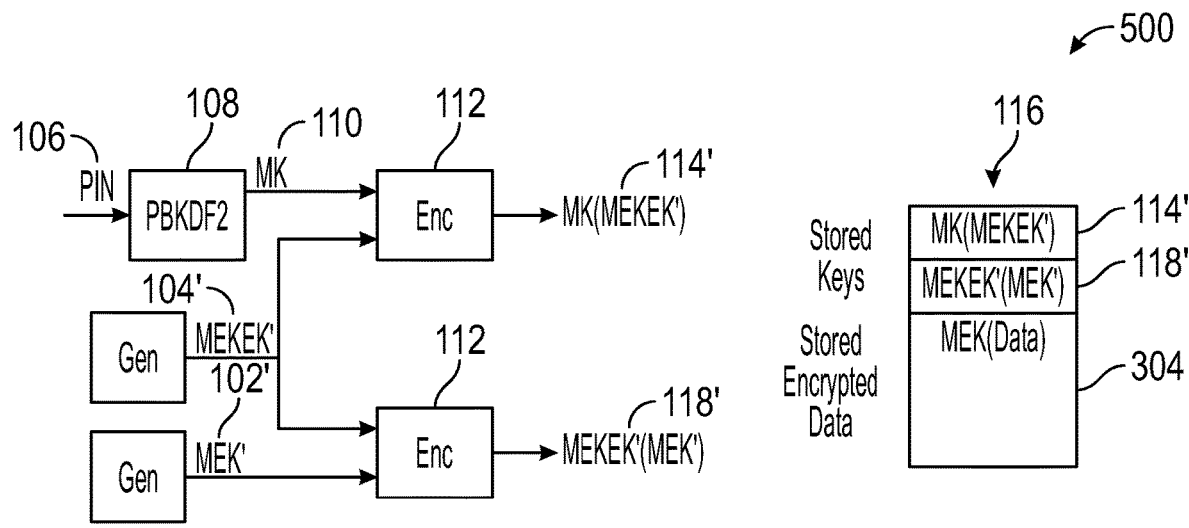
FIG. 5 is a block diagram of data erasure in a SED by key update.

Data erasure may be effected as shown in block diagram 500 of FIG. 5 by overwriting the old values of MK(MEKEK) 114 and MEKEK(MEK) 118 by generating new MEK' 102' and MEKEK' 104' at the drive, and following the same generation and encryption functions with the PIN 106. This does not affect the data, but the overwriting of the keys MEK 102 and MEKEK 104 prevent the encrypted data from being decrypted, since the decryption key is no longer available. Commercial encryption follows standard protocols for secure encryption, such as the advanced encryption standard (AES) available from the National Institute of Standards and Technology (NIST), although the encryption standard may differ without departing from the scope of the disclosure.

Key rotation is used to maintain data security. Key rotation is a common procedure used for proactive security. By periodically updating the key, the impact of key or data loss is reduced. Key rotation is often mandated in high-security environments. It is required by The Payment Card Industry Data Security Standard (PCI DSS) and is recommended by NIST. Key update can be an effective countermeasure to protect against correlation-based side-channel attacks.

Typical key updating involves generating a new key, reading ciphertext data from the SED, decryption of the data to recover plain text, encrypting the plain text data using the new encryption key, and storing new ciphertext data. There are privacy and security concerns with this approach, as it exposes the clear value of user's data for key update or rotation. Another limitation of this approach is that it uses two cryptographic operations on the actual data. As data sets can be very large, two such operations can be very time consuming.

Embodiments of the present disclosure provide drive organization for an SED. Drive organization for an SED includes a nested construction for stored keys, allowing for key update or rotation without exposing user data in the clear. Further, the drive organization of embodiments of the present disclosure provides nested stored keys for key update/rotation by wrapping wraps keys in one embodiment to nest multiple levels of rotated keys.

Figure 6:
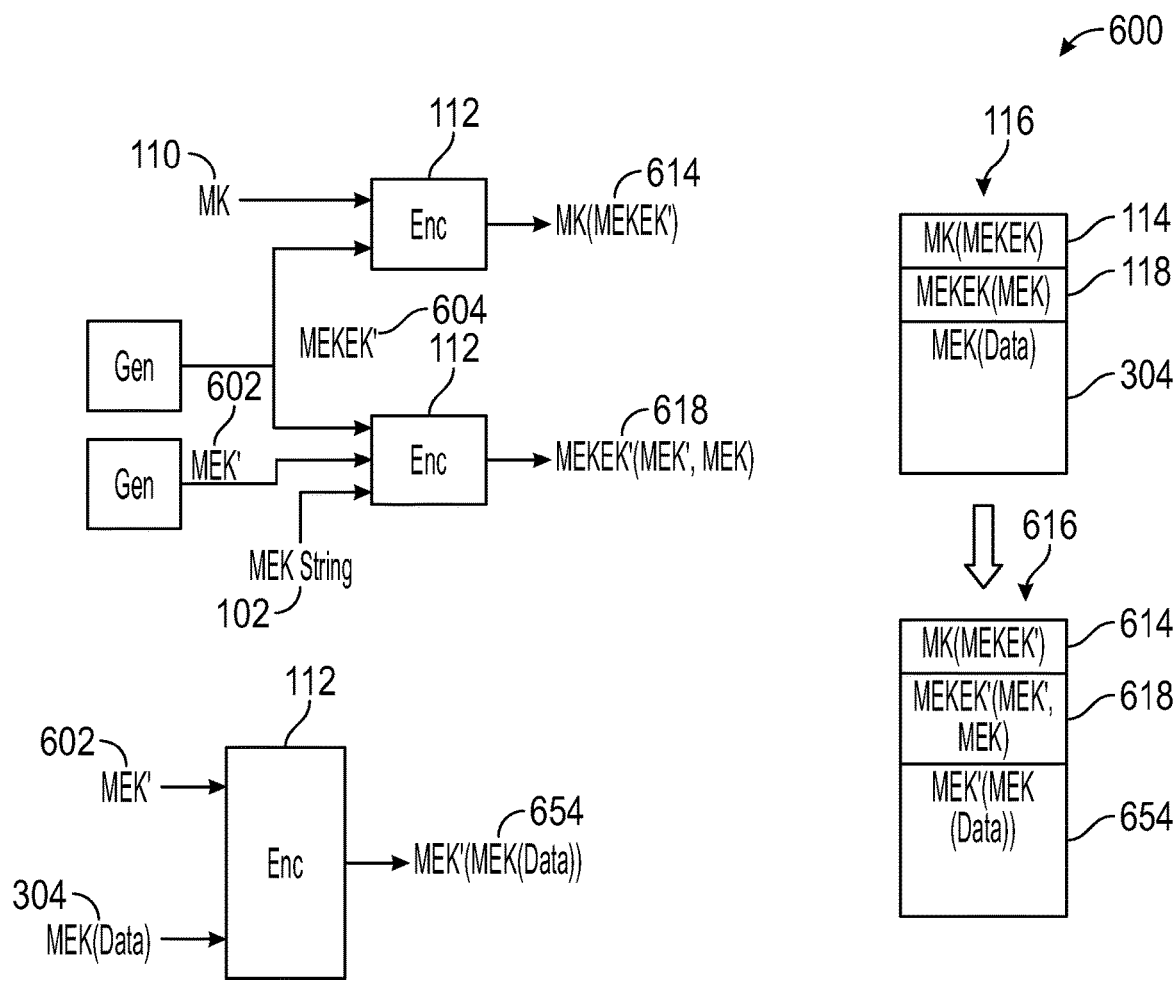
FIG. 6 is a block diagram of key rotation and data re-encryption in a SED according to an embodiment of the present disclosure.

Updating a set of wrapping keys MEK and MEKEK that have been used to encrypt data that is stored on an SED is shown in block diagram 600 of FIG. 6. Key update/rotation is accomplished in one embodiment by retrieving the oldest MEK 102 as described above. Then, new keys MEK' 602 and MEKEK' 604 are generated. MEKEK' 604 is encrypted with MK 110 by encryption engine 112 to obtain ciphertext MK(MEKEK') 614. This is stored over the original MK(MEKEK) 114 as shown at 616.

MEK' 602 and MEK 102 are concatenated into an MEK string that contains the concatenation of MEK iterations. It should be understood that MEK 102 may be a MEK string as described elsewhere herein. The concatenated MEKs 602 and 102 are encrypted with MEKEK' 604 by encrypting MEK' 602 and MEK 102 using encryption engine 112 to obtain ciphertext MEKEK'(MEK', MEK) 618. This is stored over the original MEKEK(MEK) ciphertext 118 as shown at 616.

To re-encrypt original MEK(data) ciphertext 304 without decrypting the data into the clear, the MEK' 602 is used to encrypt the MEK(data) ciphertext 304 with encryption engine 112 to obtain MEK'(MEK(data)) 654. This is stored over the original MEK(data) 304 as shown at 616. In this way, the keys MEK and MEKEK are rotated to MEK' and MEKEK' without any user data 302 being in the clear. Further, the original data 302 is not decrypted at all, so that a decryption process for user data is not performed for key rotation/update. Re-encryption is of the ciphertext data MEK(data) 304 with a new key to be encrypted in the nested MEK string 618.

After re-encryption of the encrypted data, the user data is double encrypted, but has the same size as the original encrypted data. In an AES encryption scheme, re-encrypting the same data does not impact its size. That is, the size of the ciphertext is the same as the size of the plaintext. This is also true for a ciphertext obtained by re-encryption. The size of the ciphertext 618 of the MEK string has increased and now contains the encryption of two keys MEK' and MEK instead of one key MEK. This nested approach comes with a size overhead of the ciphertext 618. However, it provides increased security and privacy by not exposing the clear value of user data. Additionally, it allows performance of a single operation on user data compared to the decrypt and encrypt approach that exposes user data in the clear.

Figure 7:
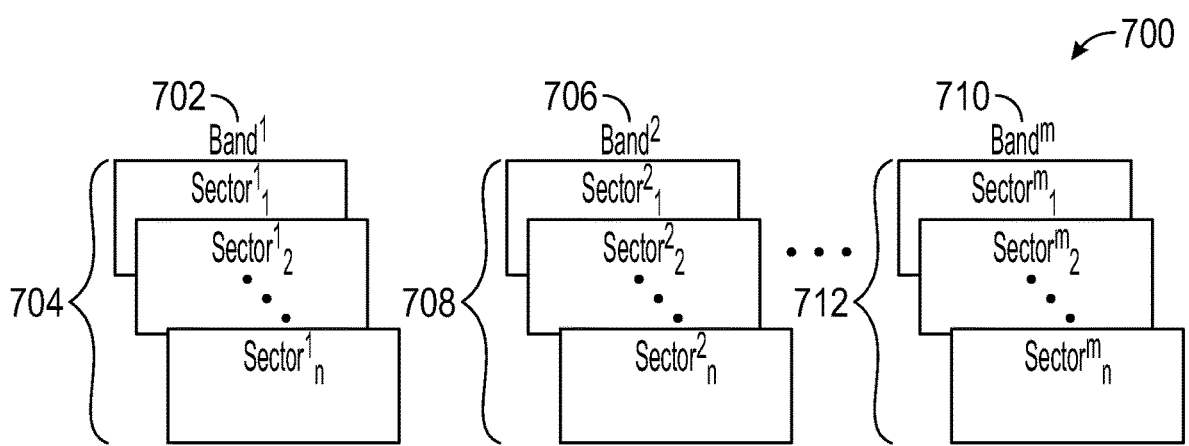
FIG. 7 is a block diagram of drive organization in a SED.

While data has been described above as being stored in an SED, most drives are not a single storage area, but are broken into a certain number of bands. Each band contains a number of sectors. A sector is the smallest physical storage unit on the drive. Referring to FIG. 7, a block diagram of a drive 700 with m bands (1, 2, 3, . . . , m) and n sectors (1,2, 3, . . . , n) per band. As shown in FIG. 7, band1 702 has sectors 704. Band2 706 has sectors 708, and bandm 710 has sectors 712.

On a self-encrypting drive, a specific different MEK is assigned to each band (e.g., MEK1 for band1, MEK2 for band2, MEKm for bandm. A single MEKEK may be shared by all bands, or each band may have its own different MEKEK. The examples discussed below discuss a drive with each band having its own MEKEK. It should be understood that drives with a single MEKEK are within the scope of the disclosure.

Figure 8:
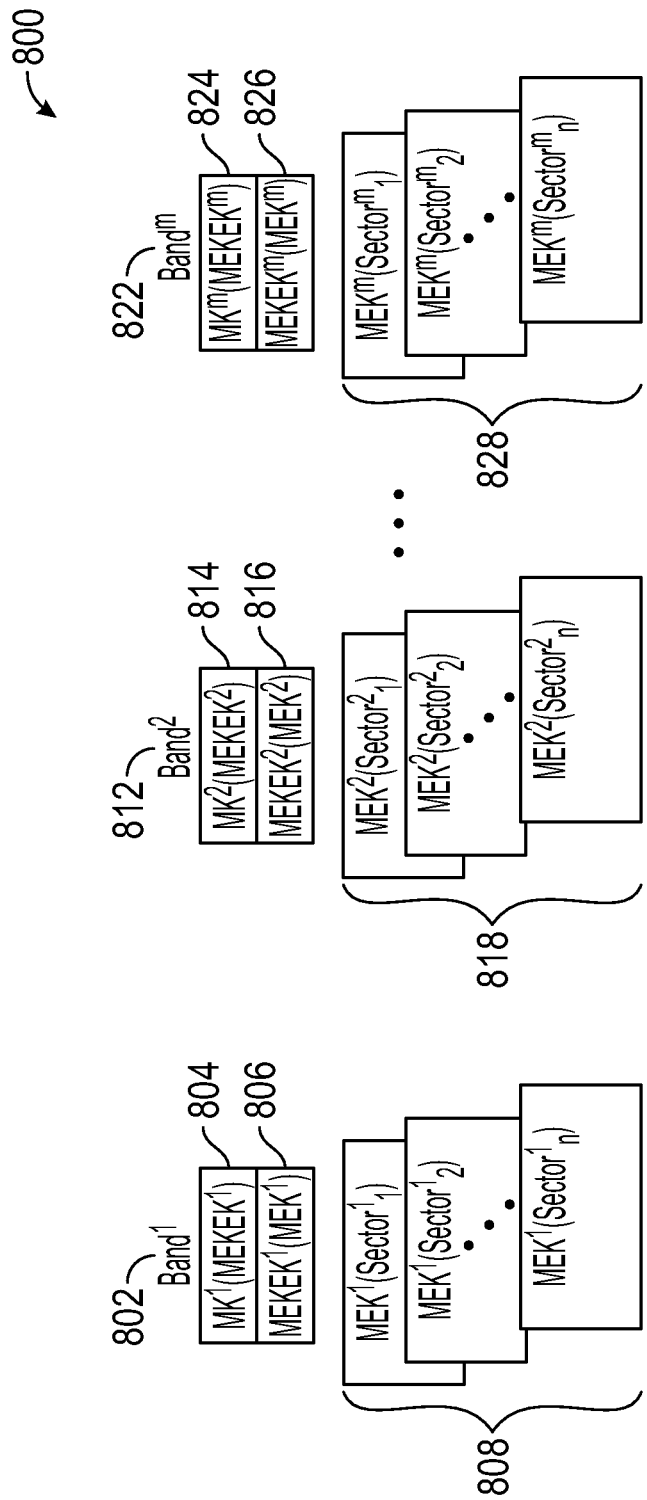
FIG. 8 is a block diagram of drive organization and key and data storage in a SED on which embodiments of the disclosure may be practiced.

Referring to FIG. 8, a SED 800 is shown. Drive 800 contains m bands, band1 802, band2 812, . . . , bandm 822. Each band of drive 800 has n sectors. Each band of drive 800 has its own MEK (e.g., MEK1 for band1, MEK2 for band2, . . . , MEKm for bandm) and its own MEKEK (e.g., MEKEK1 for band1, MEKEK2 for band2, . . . , MEKEKm for bandm). Band1 802 has sectors 808. Band2 812 has sectors 818. Bandm 822 has sectors 828. Each band has stored keys outside of the data storage sectors. Band1 has stored ciphertext of its keys MEKEK1 and MEK1 in the form of MK(MEKEK1) in 804 and MEKEK1(MEK1) in 806. Band2 has stored ciphertext of its keys MEKEK2 and MEK2 in the form of MK(MEKEK2) in 814 and MEKEK2 (MEK2) in 816. Bandm has stored ciphertext of its keys MEKEKm and MEKm in the form of MK(MEKEKm) in 824 and MEKEKm(MEKm) in 826.

Figure 9A:
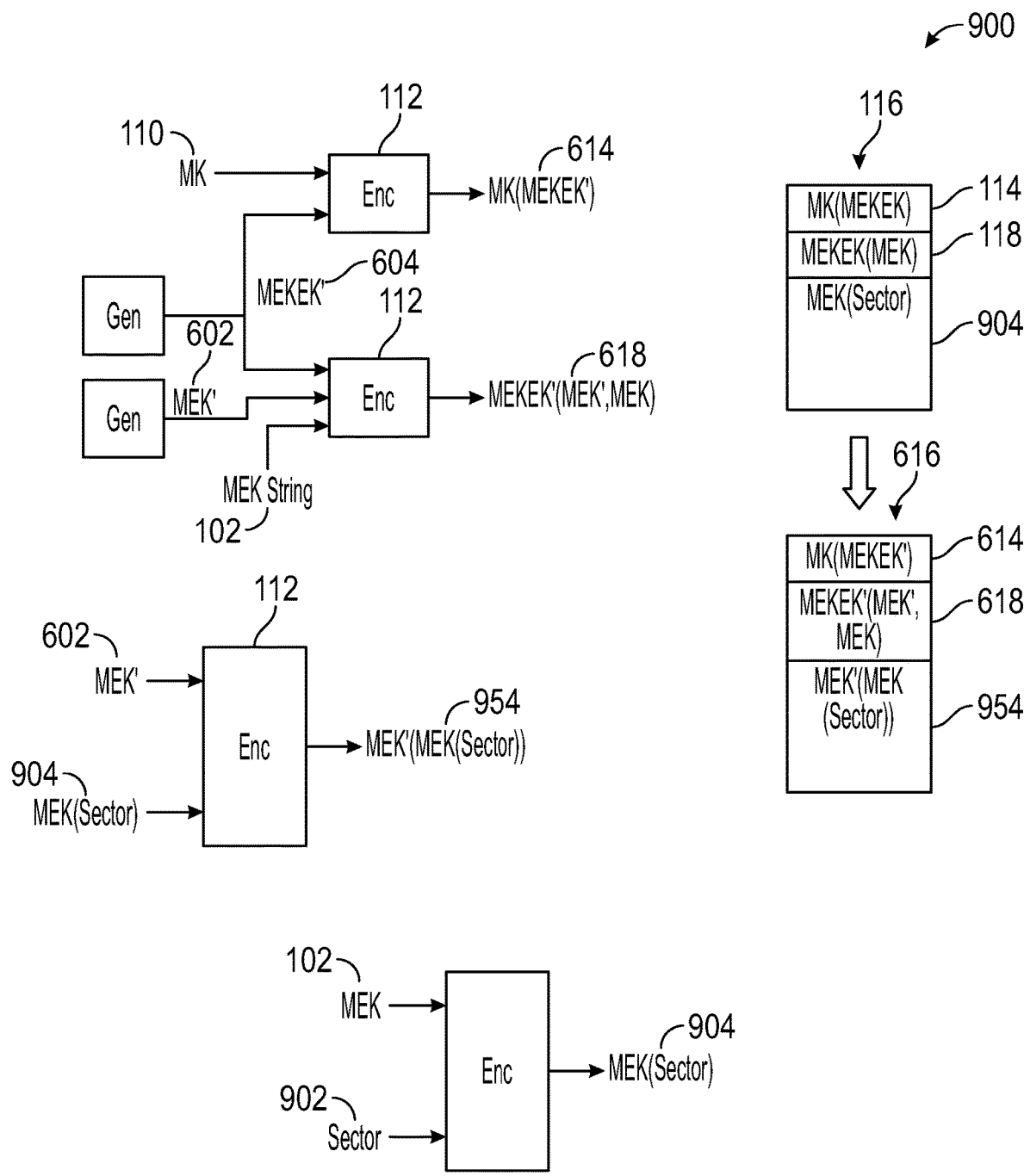
FIG. 9A is a block diagram of key rotation and data re-encryption in a SED according to an embodiment of the present disclosure.

FIG. 9A is a reproduction of FIG. 6 in which the data 902 that is encrypted is sector data. Accordingly, all reference numerals are the same with the exception of the sector identifiers. That is, encrypted data is sector data encrypted with MEK and identified as MEK(sector) 904. Re-encrypted data is 954. It should be understood that MEK 102 may be a MEK string as described elsewhere herein.

In a ciphertext string 618 of fixed static length, the concatenated MEK string is assigned a static length, with the oldest MEK 102 as the last value in the MEK string, and subsequent MEK', . . . entries are also present. Any entry of the N entries that is not an MEK contains a null key. Therefore, instead of being just the length of the MEK or multiple MEKs in the string, the ciphertext 618 has a fixed length. This is done, in one embodiment, to make it more difficult to determine a number of levels of nested encryption, which also makes it more difficult to determine a relative age of the data. Further, a static length string for the ciphertext 618 is easier to work with. The encrypted data MEK(data) and the re-encrypted data (MEK'(MEK(data)) are the same length.

In one embodiment, a length of the ciphertext string 618 is set at a static fixed length, allowing for re-encryption of the ciphertext data to be performed a certain number of times N before the ciphertext string 618 is refreshed. Such a number may be set by a manufacturer, for example. The length of the MEK string is in one embodiment fixed as an integer (N+2) times the number of digits in each MEK, MEK', . . . . For example, if N=10, the length of the MEK string for media encryption keys MEK, MEK', . . . is 12 (e.g., N+2) times the length of any individual MEK. After drive erasure, or manufacturing, there are (N+1) null keys and the oldest MEK. Each new generation of a new MEK will replace a null key. When there are fewer than N MEKs in the MEK string, null values are inserted into all slots that are not filled by MEKs. An N of 10 allows 10 re-encryptions.

Figure 9B:
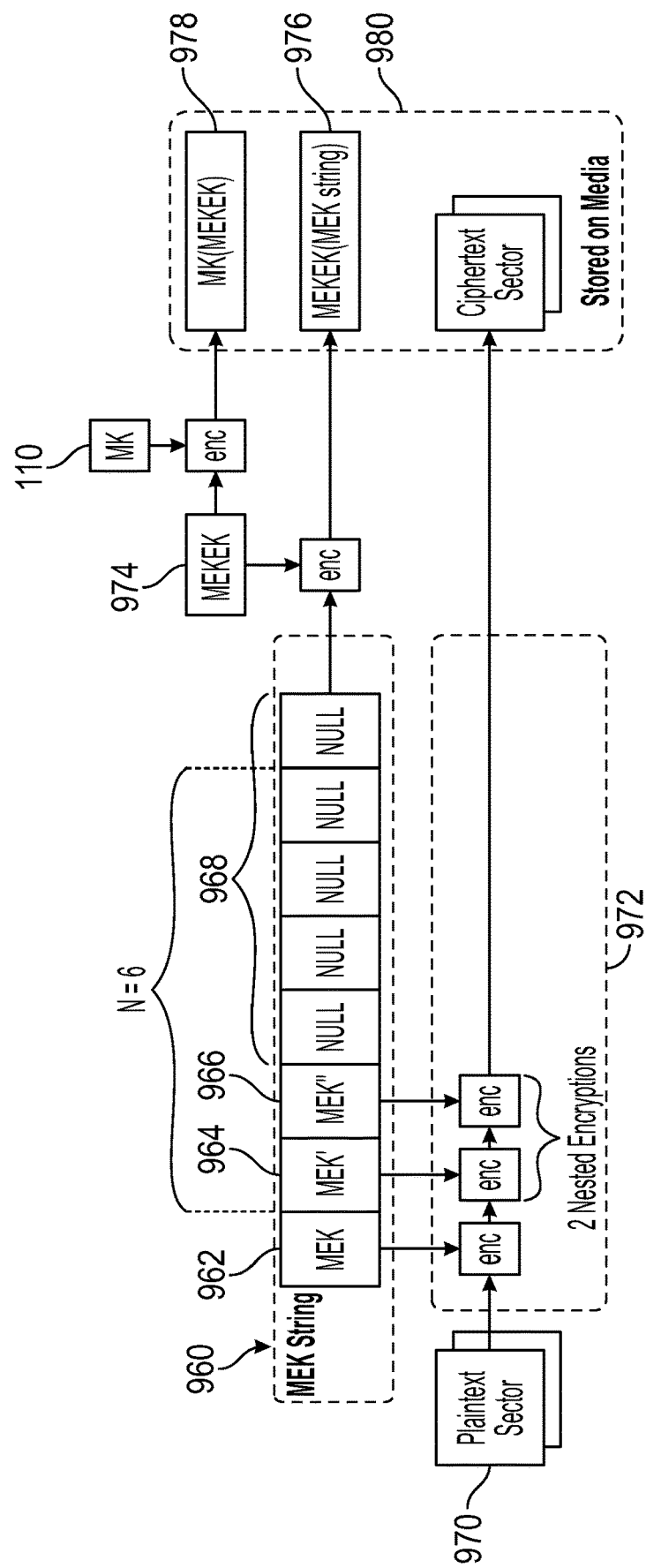
FIG. 9B is an example diagram showing a MEK string according to an embodiment of the present disclosure.

FIG. 9B is an illustration showing a MEK string 960 having eight slots for MEK iterations. The MEK string 960 as shown contains three MEK iterations MEK 962, MEK' 964, MEK" 966, and five nulls 968. This string may be written as (null, null, . . . , null, MEK", MEK', MEK) or as (MEK", MEK', MEK). The MEK string 960 supports six re-encryptions and as shown, has two re-encryptions in use. Plaintext data 970 is encrypted with the two nested re-encryptions and the original encryption as represented at 972 to obtain ciphertext 980. The MEK string 960 is encrypted with the current MEKEK 974 to obtain ciphertext MEKEK (MEK strong) 976. The current MEKEK 974 is encrypted with the derived master key 110 to obtain ciphertext MK(MEKEK) 978.

FIG. 10 illustrates an example of a single band of a drive such as drive 800 showing a single band 802 before any key update, at 1002. At 1002, band 802 has its original ciphertext stored MEKEK at $804_0$ and MEK plus (N+1) nulls at $806_0$ and encrypted data at $808_0$ in its sectors. A first key update is performed, and the band 802 is shown after the first key update at 1004. At 1004, band 802 has its updated ciphertext stored MEKEK at $804_1$, concatenated MEK and MEK' plus N nulls at $806_1$, and twice-encrypted data $808_1$ in its sectors. A second key update is performed, and the band 802 is shown after the second key update at 1006. At 1006, band 802 has its again updated ciphertext stored MEKEK at $804_2$ and concatenated MEK, MEK', and MEK" plus (N−1) nulls at $806_2$ and encrypted data $808_2$ in its sectors.

Bands such as bands 802, 812, and 822 of a drive do not have to have the same number of key rotations and key updates. That number may differ by band. FIG. 11 illustrates an example of multiple bands 1102, 1104, and 1106 of a drive such as drive 800 at the same moment in time. Band1 1102 has had its original band keys MEK and MEKEK updated twice. This is evidenced by the ciphertext 1104 with encrypted MEKEK", ciphertext 1106 with three non-null MEKs, and triple-encrypted sector data 1108. Band2 1112 has had its original band keys MEK and MEKEK updated once. This is evidenced by the ciphertext 1114 with encrypted MEKEK', ciphertext 1116 with two non-null MEKs, and double-encrypted sector data 1118. Bandm 1122 has its original band keys MEK and MEKEK. This is evidenced by the ciphertext 1124 with encrypted MEKEK, ciphertext 1126 with one original non-null MEK, and single-encrypted sector data 1108.

In one embodiment, with the number of possible re-encryptions limited to N, the field assigned to the encryption of the generations of MEKs is sized such that it contains up to (N+2) MEKs. Such a field allows up to N re-encryptions of user data. At drive initialization, or after data erasure, the ciphertext 618 contains there are (N+1) null keys and a single MEK. As re-encryption after key rotation is performed new generations of MEK (e.g., MEK', MEK", ... ) replace the null keys.

Decrypting ciphertext 654, 954 to obtain data 302, 902 in the clear is accomplished as follows. The ciphertext 618 is decrypted to retrieve the MEK string in the clear. This identifies how many non-null MEKs are in the ciphertext 618 and their values. Then, based on the number of non-null MEKs, the number of nested layers to be removed is known. MEK retrieval is accomplished as discussed above with respect to FIG. 2. At this point, the number of nesting layers to be removed in order to decrypt user data is known.

For example, if there are two MEKs (MEK and MEK') in the decryption of ciphertext 618, two iterations of decryption are used. MEK' is used as the key to decrypt MEK' (MEK(data)) to retrieve MEK(data), and MEK is used to decrypt MEK(data) to obtain the data in the clear.

Therefore, the number of encryptions used for a write process is 1 to N, and the number of decryptions used for a read process is 1 to N, depending on the number of non-null MEKs. This is summarized below in Table 1.

TABLE 1

| Operation | Cost |
| --- | --- |
| Read | 1 to N decryptions |
| Write | 1 to N encryptions |
| ReEncryption | If current encryption levels < N |
| | 1 encryption |
| | Else |
| | N−1 decryptions + 1 encryption (approach 1) |
| | 1 decryption + 1 encryption (approach 2) |

For re-encryption, it is shown in Table 1 that if the current number of encryption levels is less than N, that is, there is at least one null value in the ciphertext string 618, then re-encryption uses one encryption process. However, with the setting of a static size of the ciphertext string 618, when the limit on re-encryptions has been reached, the ciphertext string 618 is refreshed as described below.

There are several options for refreshing the ciphertext string 618. In a first option, when the number of re-encryptions equals N, and another re-encryption is to be performed, a number of nesting layers of MEKs are removed. In one embodiment, N−1 non-null MEKs are removed, starting with the most recent, and extending back to one before the oldest MEK in the ciphertext string. Leaving the oldest MEK in the ciphertext string avoids exposing any user data in the clear.

A method 1200 of refreshing a ciphertext string is shown in flow chart form in FIG. 12. Method 1200 comprises, in one embodiment, retrieving a MEK string in block 1202, and generating a new MEK and MEKEK in block 1204. In decision block 1206, it is determined whether the number of re-encryptions is less than N. This is determined in one embodiment by counting a number of non-null MEK iterations from the decrypted MEK string. If the number of re-encryptions is less than N, the new MEK is concatenated with all old MEK iterations and nulls and encrypted in block 1208. The new MEKEK is encrypted in block 1210 to replace the current MEKEK that has been decrypted from the MK(MEKEK) ciphertext. The encrypted ciphertext data is re-encrypted with the new MEK in block 1212, and the encrypted new MEKEK, encrypted MEK string, and re-encrypted ciphertext data are stored in the SED in block 1214.

If the number of re-encryptions is not less than N, then (N−1) nesting layers of encryption are removed from the encrypted data using the MEK iterations from the MEK string in block 1218. The N middle MEK iterations are erased from the decrypted string of MEK iterations in block 1220, and process flow continues at block 1208 as described above. The new ciphertext string of MEK iterations contains all previous MEK iterations plus the new MEK when the number of existing re-encryptions is less than N. The new ciphertext string of MEK iterations contains the oldest MEK and a single new MEK iteration when the number of existing re-encryptions is not less than N, after the removal of N middle MEK iterations and the concatenation of the new MEK with the oldest MEK.

In another embodiment, shown in flow chart form in FIG. 13, a ciphertext refresh method 1300 that is faster than the method 1200 is shown. Method 1300 comprises, in one embodiment, retrieving a MEK string in block 1302, and generating a new MEK and a new MEKEK in block 1304. In decision block 1306, it is determined whether the number of re-encryptions is less than N. If the number of re-encryptions is less than N, the method is identical to the "no" decision of block 1206 of method 1200, and continues at block 1208 thereof.

If the number of re-encryptions is not less than N, then the upper nesting layer (e.g., the newest MEK iteration of the MEK string) of encryption of the encrypted data is removed in block 1308. The (N+1)th MEK iteration of the MEK string is removed and replaced with the new MEK as the (N+1)th MEK iteration in the MEK string in block 1310. The MEK string is encrypted with nulls to fill the string length in block 1312. At this point, the method is identical to the method 1200 starting at block 1210, and therefore continues at block 1210 thereof.

Referring back to Table 1, when the number of current encryption levels is less than N, one encryption operation takes place on the data, without showing data in the clear. When the number of current re-encryptions is N, then there are (N−1) decryptions plus one encryption in the method 1200. When the number of re-encryptions is N, then there is one decryption plus one encryption in the method 1300. Method 1300 uses fewer decryptions, but the next time a key rotation is indicated, the process will be performed again, and again each time the keys are updated.

The age of a ciphertext can leak sensitive private information about the plain text in many real world situations. Embodiments of the present disclosure, by using a fixed size MEK string (of MEKs) and padding the string with null values for the field containing all the generations of MEKs, means that the design does not reveal an age of the ciphertext (e.g., the number of times that the ciphertext was re-encrypted since it was initially created) to an observer who does not have access to a user PIN, without which the number of re-encryptions cannot be determined. Further, the nesting of layers of encrypted plain text to include the MEKs and MEKEKs, as well as the string of MEKs for key update, adds additional layers of security.

Embodiments of the present disclosure provide a key update solution that increases privacy and security, since at no point during key rotation is user data in the clear. Since user data is not revealed in the clear, privacy leakage and security risks are reduced. Further, embodiments of the present disclosure reduce the amount of encryption/decryption operations on user data by re-encrypting the encrypted user data without decrypting it for a key update. The cost of re-encryption is reduced to only one encryption compared to a decrypt then re-encrypt approach. The computational overhead for this privacy and security enhancement is that the number of decryptions when the user gets back the plaintext is increased by one decryption for each re-encryption performed on the ciphertext. However, the size overhead of the nesting impacts the size of the field encrypting the generations of MEKs only, and not of the data sectors, which means that this overhead is only per band.

Figure 14:
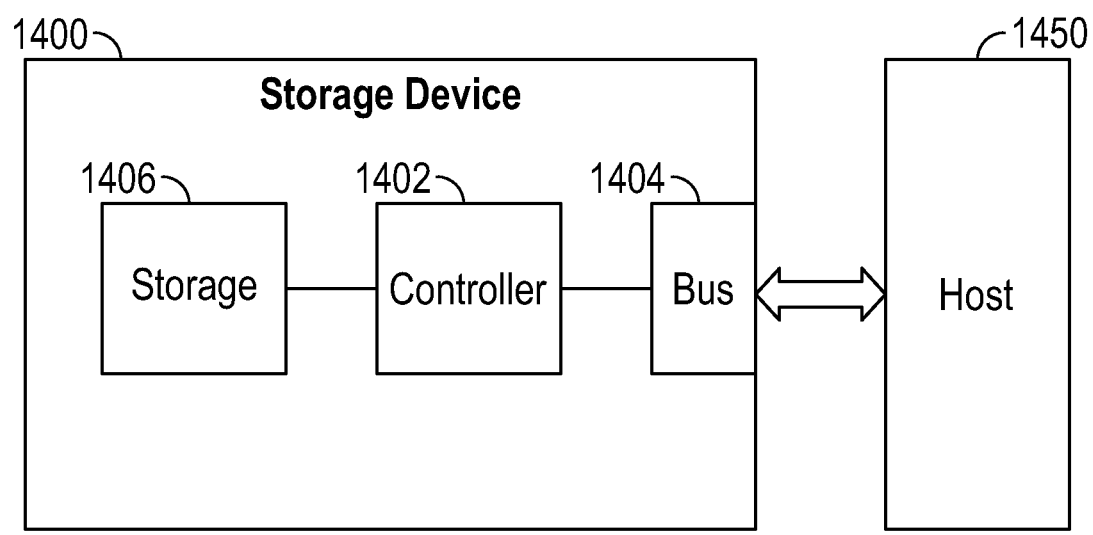
FIG. 14 is a block diagram of a data storage device on which embodiments of the present disclosure may be used.

Referring now to FIG. 14, a simplified block diagram of a storage system 1400 on which embodiments of the present disclosure may be practiced is shown. Storage system 1400 may be a HDD with platters, a read head, and associated controllers. System 1400 may include, by way of example, a controller 1402 couplable via a bus 1404 or the like to a host system 1450, where the host system 1450 may provide power over the bus 1404 or through a separate power bus (not shown), and a storage component 1406 (such as a spinning disk or platter of disks). Controller 1402 is configured to carry out encryption processing in accordance with one or more of the methods described above. To carry out the encryption processing, the controller 1402 may execute instructions stored on any tangible computer-readable medium/memory in storage system 1400.

Figure 15:
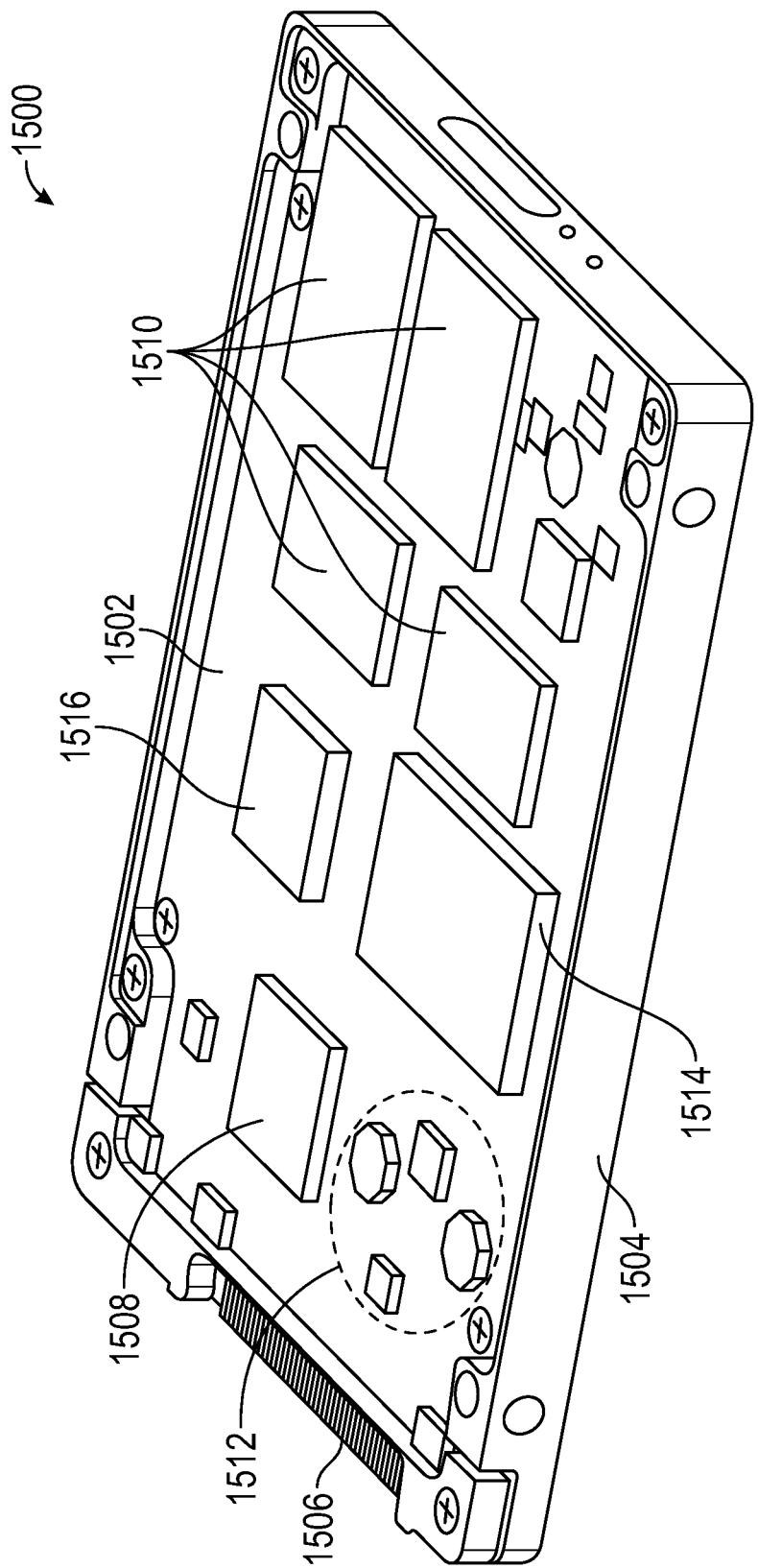
FIG. 15 is an oblique view of a solid state drive (SSD) on which embodiments of the present disclosure may be used.

FIG. 15 illustrates an oblique view of a solid state drive (SSD) 1500 in accordance with a system embodying the methods described herein may be used. SSD 1500 includes one or more printed circuit boards (PCBs) or circuit card assemblies 1502 and typically includes a protective, supportive housing 1504, and one or more interface connectors 1506. SSD 1500 further includes a controller application specific integrated circuit (ASIC) 1508 or field programmable gate array (FPGA), one or more non-volatile memory devices 1510, and power regulation circuitry 1512. The memory devices 1510 are essentially the SSD's data storage media. SSD 1500 may include erasure blocks as the physical storage locations within memory device 1510, which may include Flash memory devices, for example. In some applications, SSD 1500 further includes a power-backup energy storage device, such as a super-capacitor 1514.

In accordance with certain aspects, the SSD 1500 includes the circuit card assembly 1502 that includes a connector 1506 for connection to a host computer (not shown). In accordance with certain aspects, the connector 1506 includes a NV Me (non-volatile memory express), SCSI (small computer system interface), SAS (serial attached SCSI), FC-AL (fiber channel arbitrated loop), PCI-E (peripheral component interconnect express), IDE (integrated drive electronics), AT (advanced technology), ATA (advanced technology attachment), SATA (serial advanced technology attachment), IEEE (institute of electrical and electronics engineers)-1394, USB (universal serial bus) or other interface connector adapted for connection to a host computer. Controller ASIC 1508 is configured to carry out encryption processing in accordance with one or more of the methods described above. To carry out the encryption processing, the controller ASIC 1508 may execute instructions stored on any tangible computer-readable medium/memory in storage system 1400.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of rotating a set of keys, having a media encryption key (MEK) and a current media encryption key encryption key (MEKEK) encrypted and stored in a self-encrypting drive (SED) having data encrypted with the MEK (MEK(data)), the method comprising:
  decrypting, in the SED, the stored MEK and the current MEKEK, the MEK comprising a MEK string having a combination of nested MEK iterations and null values, and wherein the MEK string has a fixed length of an integer multiple, and wherein decrypting the stored MEK comprises decrypting the MEK string;
  generating, in the SED, a new-media encryption key (MEK') and a new media encryption key encryption key (MEKEK');
  encrypting, in the SED, the MEKEK' to replace the current encrypted MEKEK;
  concatenating, in the SED, the MEK and the MEK' to obtain a concatenated key;
  encrypting, in the SED, the concatenated key with MEKEK', and storing, in the SED, the encrypted concatenated key over ciphertext comprising MEK encrypted with MEKEK;

re-encrypting, in the SED, the already-encrypted data MEK(data) in the SED with MEK' without decrypting the MEK(data);
storing the re-encrypted data over the MEK(data);
refreshing the MEK string, wherein refreshing comprises:
generating a new MEK iteration and a new MEKEK;
determining a number of re-encryptions of the encrypted data that has previously occurred, as indicated by a number of non-null MEKs in the MEK string;
when the number of re-encryptions is less than a predetermined number N of re-encryptions:
concatenating the new MEK iteration with all nested MEK iterations of the decrypted MEK string;
encrypting the concatenated new MEK iteration and all nested MEK iterations with nulls to fill out a remainder of the MEK string;
encrypting the new MEKEK to replace the current encrypted MEKEK; and
re-encrypting the encrypted data with the new MEK.

2. The method of claim 1, wherein decrypting the MEK comprises decrypting all nested MEK iterations in the MEK string.

3. The method of claim 1, wherein encrypting a concatenation of the MEK and the MEK' comprises encrypting all the nested MEK iterations from the MEK string with the MEK'.

4. The method of claim 1, wherein decrypting the MEK comprises:
deriving a master key (MK) from a user password (PIN);
decrypting the current MEKEK from the encrypted MEKEK (MK(MEKEK)) by decrypting MK(MEKEK) with MK; and
decrypting the MEK from the encrypted MEK (MEKEK (MEK)) by decrypting MEKEK(MEK) with MEKEK.

5. The method of claim 1, wherein refreshing further comprises:
when the number of re-encryptions is not less than N:
removing (N−1) layers of encryption from the encrypted data using the (N−1) newest MEK iterations;
erasing the N middle MEK iterations from the MEK string;
concatenating the new MEK and all remaining MEK iterations of the decrypted MEK string;
encrypting the concatenated MEK string with nulls to fill out a remainder of the MEK string;
encrypting the new MEKEK to replace the current encrypted MEKEK; and
re-encrypting the encrypted data with the new MEK; and
storing the encrypted current MEKEK, encrypted MEK string, and re-encrypted data in the SED.

6. The method of claim 1, wherein refreshing further comprises:
when the number of re-encryptions is not less than N:
removing a last nesting layer of encryption from the encrypted data using the newest MEK iteration;
erasing the (N+1)th MEK iteration from the string of MEK iterations;
shifting the new MEK to the (N+1)th MEK iteration of the MEK string;
encrypting the MEK string;
encrypting the new MEKEK to replace the current encrypted MEKEK; and
re-encrypting the encrypted data with the new MEK; and
storing the encrypted current MEKEK, encrypted MEK string, and re-encrypted data in the SED.

7. A method of updating a key in a self-encrypting drive (SED) storing encrypted data MEK(data), comprising:
deriving, in the SED, a master key (MK) from a user password (PIN);
decrypting, in the SED, wrapping keys comprising a media encryption key (MEK) and a media encryption key encryption key (MEKEK) from stored ciphertext MEKEK(MEK) and MK(MEKEK) using the MK;
generating, in the SED, new wrapping keys MEK' and MEKEK';
re-encrypting, in the SED, the already-encrypted data MEK(data) in the SED with MEK' without decrypting the MEK(data) to obtain ciphertext MEK'(MEK(data));
encrypting, in the SED, MEKEK' with MK to obtain new ciphertext MK(MEKEK');
encrypting, in the SED, a concatenation of MEK and MEK' with MEKEK' in a MEK string to obtain new ciphertext MEKEK'(MEK', MEK), wherein encrypting a concatenation comprises:
concatenating MEK and MEK' in the MEK string; and
encrypting the MEK string with new wrapping key MEKEK'; and
wherein concatenating further comprises:
providing a fixed length for the MEK string, the fixed length being an integer multiple of a size of an MEK iteration; and
padding the MEK string with null values for a remaining length of the MEK string after concatenating the MEK and MEK';
storing, in the SED, ciphertext MEK'(MEK(data)), ciphertext MK(MEKEK'), and ciphertext MEKEK' (MEK', MEK) in the SED such that MEK'(MEK(data)) replaces MEK(data) and MEKEK'(MEK', MEK) replaces MEKEK(MEK);
refreshing the stored MEK, wherein the refreshing comprises:
generating a new MEK iteration and a new MEKEK;
determining a number of re-encryptions of the encrypted data that has previously occurred, as indicated by a number of non-null MEKs in the MEK string;
when the number of re-encryptions is less than a predetermined number N of re-encryptions:
concatenating the new MEK iteration and all MEK iterations of the decrypted MEK string into a new MEK string;
encrypting the new MEK string with nulls to fill out a remainder of the new MEK string;
encrypting the new MEKEK to replace the current encrypted MEKEK; and
re-encrypting the encrypted data with the new MEK.

8. The method of claim 7, and further comprising:
when an additional update of a key is desired, deriving the master key (MK) from the user password (PIN);
decrypting the current MEKEK from MK(MEKEK') with the MK;
decrypting MEK' and MEK from MEKEK'(MEK', MEK) with the current MEKEK;
generating new wrapping keys MEK" and MEKEK";
re-encrypting MEK'(MEK(data)) with MEK" to obtain ciphertext MEK"(MEK'(MEK(data)));
encrypting MEKEK" with MK to obtain new ciphertext MK(MEKEK");

encrypting a concatenation of all MEK iterations with MEKEK" to obtain ciphertext MEKEK"(MEK", MEK', MEK); and storing ciphertext MEK"(MEK'((MEK(data))), ciphertext MK(MEKEK"), and ciphertext MEKEK"(MEK", MEK', MEK) in the SED.

9. The method of claim 7, and further comprising:
when the MEK is to be updated, updating the MEK string additional times by:
generating a new MEK and a new MEKEK;
concatenating all decrypted MEK iterations from the MEK string with the new MEK and nulls to fill out a remainder of the MEK string into a new MEK string;
encrypting the new MEK string with the new MEKEK to replace the current encrypted MEKEK;
encrypting the new MEKEK with the MK; and
re-encrypting user data with the new current MEK.

10. The method of claim 7, wherein refreshing further comprises:
when the number of re-encryptions is not less than N:
removing (N−1) layers of encryption from the encrypted data using the (N−1) newest MEK iterations;
erasing the N middle MEK iterations from the MEK string;
concatenating the new MEK and all remaining MEK iterations of the decrypted MEK string;
encrypting the concatenated MEK string with nulls to fill out a remainder of the MEK string;
encrypting the new MEKEK to replace the current encrypted MEKEK; and
re-encrypting the encrypted data with the new MEK; and
storing the encrypted current MEKEK, encrypted MEK string, and re-encrypted data in the SED.

11. The method of claim 7, wherein refreshing further comprises:
when the number of re-encryptions is not less than N:
removing a last nesting layer of encryption from the encrypted data using the newest MEK iteration;
erasing the (N+1)th MEK iteration from the string of MEK iterations;
shifting the new MEK to the (N+1)th MEK iteration of the MEK string;
encrypting the MEK string;
encrypting the new MEKEK to replace the current encrypted MEKEK; and
re-encrypting the encrypted data with the new MEK; and
storing the encrypted current MEKEK, encrypted MEK string, and re-encrypted data in the SED.

12. A method of refreshing a nested concatenation of a plurality of media encryption key (MEK) iterations and a current media encryption key encryption key (MEKEK) stored in encrypted form, the media encryption key iterations used for nested encryption and re-encryption of user data without decryption in a self-encrypting drive (SED) in which re-encrypted user data is stored over previously-encrypted user data, the method comprising:

decrypting the plurality of media encryption key iterations to a MEK string, wherein the plurality of media encryption key iterations is stored in a fixed length MEK string having a length that is (N+2) times a length of an MEK in the MEK string, and comprising all previous MEK iterations and null-value MEK iterations for remaining space of the fixed length MEK string;
generating a new media encryption key and a new media encryption key encryption key;
determining, in the SED in which the re-encrypted user data is stored over the previously-encrypted user data, a number of re-encryptions of the user data using a number of non-null MEK entries in the decrypted MEK string; and
refreshing the stored MEK string, wherein refreshing comprises:
generating a new MEK and a new MEKEK;
when the number of re-encryptions is less than a predetermined number N of re-encryptions:
concatenating the new MEK and all MEK iterations of the decrypted MEK string;
encrypting the concatenated new MEK and MEK iterations with nulls to fill out a remainder of the MEK string;
encrypting the new MEKEK to replace the current encrypted MEKEK; and
re-encrypting the encrypted data with the new MEK.

13. The method of claim 12, wherein refreshing further comprises:
when the number of re-encryptions is not less than N:
removing (N−1) layers of encryption from the encrypted data using the (N−1) newest MEK iterations;
erasing the N middle MEK iterations from the MEK string[ ];
concatenating the new MEK and all remaining MEK iterations of the decrypted MEK string;
encrypting the concatenated new MEK and MEK iterations with nulls to fill out a remainder of the MEK string;
encrypting the new MEKEK to replace the current encrypted MEKEK; and
re-encrypting the encrypted data with the new MEK; and
storing the encrypted current MEKEK, encrypted MEK string, and re-encrypted data in the SED.

14. The method of claim 12, wherein refreshing further comprises: when the number of re-encryptions is not less than N: removing a last nesting layer of encryption from the encrypted data using the newest MEK iteration; erasing the (N+1)th MEK iteration from the string of MEK iterations; shifting the new MEK to the (N+1)th MEK iteration of the MEK string; encrypting the MEK string; encrypting the new MEKEK to replace the current encrypted MEKEK; and re-encrypting the encrypted data with the new MEK; and storing the encrypted MEKEK, encrypted MEK string, and re-encrypted data in the SED.

\* \* \* \* \*